United States Patent Office 3,450,740
Patented June 17, 1969

3,450,740
PREPARATION OF POLYHALOGENATED
PHENYLENE POLYISOCYANATES
David F. Gavin, New Haven, Ehrenfried H. Kober, Hamden, and Wilhelm J. Schnabel, Branford, Conn., assignors to Olin Mathieson Chemical Corporation, a corporation of Virginia
No Drawing. Filed July 21, 1965, Ser. No. 473,818
Int. Cl. C07c 119/04
U.S. Cl. 260—453          4 Claims

ABSTRACT OF THE DISCLOSURE

Polyhalogenated phenylene polyisocyanates are prepared by simultaneously introducing a solution of a polyhalogenated phenylene polyamine having a halogen in each position ortho to an amino group, in an inert solvent and phosgene into a reactor and then reacting the polyamine and the phosgene at a temperature of about 130 to 180° C.

This invention relates to polyhalogenated aromatic polyisocyanates and to a process for their preparation. More particularly, this invention relates to a process of preparing polyhalogenated aromatic polyisocyanates in high yields by phosgenation of polyhalogenated aromatic polyamines.

It is known that phosgenation, under conditions of the conventional two-step, cold-hot phosgenation, of highly chlorinated aromatic polyamines, in which each position ortho to an amino group is substituted by halogen, such as 2,4,6-trichlorophenylene-1,3-diamine, 2,4,5,6 - tetrachlorophenylene-1,3-diamine, 2,3,5,6 - tetrachlorophenylene 1,4-diamine and a series of chlorinated aromatic triamines as well as the corresponding brominated diamines and triamines results predominantly in only partial conversion of the amino groups with the formation of aminoarylisocyanates as described in U.S. Patent 2,884,435. Polyisocyanates, derived from a complete conversion of all amino groups present in the original polyhalogenated polyamines subjected to the phosgenation are formed only in small amounts as by-products. It has been found surprisingly that phosgenation of polyhalogenated polyamines in which each position ortho to an amino group is substituted by a halogen, according to this invention, results in complete conversion of all amino groups to isocyanato groups to give halogenated polyisocyanates.

The phosgenation process of this invention is conducted by introducing a solution of the polyamine in an inert solvent at elevated temperature into a phosgenation reactor and feeding simultaneously an excess of phosgene into the reactor. Gaseous phosgene or liquid phosgene can be employed. The temperature during the phosgenation is maintained at about 130–180° C., preferably at 160–170° C. Atmospheric pressure or super atmospheric pressure up to about 150 p.s.i. or more can be applied. Mono- or dichlorobenzene, α-chloronaphthalene, xylene, aromatic and aliphatic carbonic acid esters, ketones, etc. are suitable inert organic solvents. An excess of phosgene, ranging from 2–10 moles of phosgene to each amino group equivalent can be employed. After the phosgenation reaction has been completed, the excess of phosgene and the hydrogen chloride formed can be removed by any conventional method, such as by purging the reaction mixture at an elevated temperature with an inert gas, e.g. nitrogen, carbon dioxide, etc. After evaporation of the solvent, the formed polyisocyanates are isolated by fractional distillation, by crystallization or by any of the other methods well known in the art.

Polyhalogenated aromatic polyamines useful as starting materials in the process of this invention include those aromatic polyamines in which each position ortho to an amino group is substituted by a halogen selected from the group consisting of chlorine, bromine and fluorine. Suitable aromatic polyamines include 2,4,6-trichlorophenylene-1,3-diamine; 2,4,5,6-tetrachloro-1,3 - diamine; 2,3,5,6-tetrachloro-1,4-diamine; 2,4,6-trichlorophenylene-1,3,5-triamine, etc., and the corresponding bromine and fluorine derivatives.

The process of this invention can be operated either as a batch or continuous process.

A specific embodiment of this invention is shown in the following example which is to be considered not limitative.

EXAMPLE I

The apparatus utilized in this experiment was a 4,000 ml. fully-baffled, resin reaction kettle equipped with a turbine type agitator, a thermometer, a reflux condensor, a phosgene inlet and an inlet for the amine feed solution. Both inlets dip below the stirrer.

o-Dichlorobenzene (1000 ml.) was placed in the reactor and saturated with phosgene at 160° C. A solution of 123 grams (0.5 mol) of 2,3,5,6-tetrachlorophenylene-1,4-diamine in 1500 ml. of o-dichlorobenzene, preheated to about 100° C., was pumped into the reactor through a metering pump at a uniform rate of about 600 ml. per hour. Simultaneously, an excess of gaseous phosgene was fed into the reaction mixture at a rate corresponding to a phosgene: diamine mol ratio of 8:1. The reaction mixture was stirred at approx. 1500 r.p.m. and maintained at 160–170° C. Hydrogen chloride and excess phosgene were withdrawn through the water-cooled condenser. After completion of the phosgenation, the reaction mixture was purged with dry nitrogen at 160° C. for one hour to remove unreacted phosgene and hydrogen chloride. Small amounts of solid material were removed by filtration. An NCO-group determination by titration with di-n-butylamine showed a 73 percent conversion of total $NH_2$-groups charged to NCO-groups. Fractional distillation gave 88.6 grams (59.5 percent of the theoretical yield) of 2,3,5,6-tetrachlorophenylene-1,4 - diisocyanate, distilling at 125–130° C./0.05 mm. Hg, NCO-content 28.4 percent, M.P. 109° C. The infrared spectrum of the product was identical with that of tetrachlorophenylenediisocyanate, which was obtained by perchlorination of p-phenylene diisocyanate. About the same yield of purified product was obtained after evaporation of the solvent and recrystallization of the residue from ligroin.

The novel polyisocyanates of this invention can be reacted with polyether polyols, such as propoxylated glycerol of molecular weight of 3000 and in the presence of suitable catalysts and blowing agents to form a highly flame resistant polyurethane foam.

What is claimed is:

1. A process for preparing a polyhalogenated phenylene polyisocyanate which comprises simultaneously introducing (1) a solution of a polyhalogenated phenylene polyamine having in each position ortho to an amino group a halogen selected from the group consisting of chlorine, bromine and fluorine, in an inert organic solvent and (2) phosgene into a reactor and therein reacting with mixing at a temperature of from about 130 to 180° C., the said diamine and phosgene to yield the corresponding polyhalogenated phenylene polyisocyanate.

2. The process of claim 1 wherein the said inert organic solvent is o-dichlorobenzene.

3. The process of claim 1 wherein the said diamine is 2,3,5,6-tetrachlorophenylene-1,4-diamine.

4. The process of claim 1 wherein the said inert organic solvent is o-dichlorobenzene, and the said diamine is 2,3,5,6-tetrachlorophenylene-1,4-diamine.

References Cited

UNITED STATES PATENTS 2,683,160  7/1954  Irwin et al. _____ 260—453

OTHER REFERENCES

Johnson: J. Chem. Soc. (1955) page 3323 relied upon.

CHARLES B. PARKER, *Primary Examiner.*

D. H. TORRENCE, *Assistant Examiner.*

U.S. Cl. X.R.

260—2.5, 75, 77.5, 578